United States Patent [19]

Schiel

[11] Patent Number: 4,572,055
[45] Date of Patent: Feb. 25, 1986

[54] VACUUM POWER BRAKE BOOSTER

[75] Inventor: Lothar Schiel, Eppstein, Fed. Rep. of Germany

[73] Assignee: ITT Industries, Inc., New York, N.Y.

[21] Appl. No.: 643,068

[22] Filed: Aug. 22, 1984

[30] Foreign Application Priority Data

Aug. 24, 1983 [DE] Fed. Rep. of Germany ....... 3330481

[51] Int. Cl.⁴ .............................................. F15B 9/10
[52] U.S. Cl. ............................. 91/369 A; 91/376 R; 251/121
[58] Field of Search ............ 91/369 A, 369 C, 369 B, 91/369 R, 376 R; 251/121

[56] References Cited

U.S. PATENT DOCUMENTS

| | | | |
|---|---|---|---|
| 1,844,631 | 2/1932 | Bragg et al. | 91/376 |
| 1,846,023 | 2/1932 | Bragg et al. | 91/376 |
| 3,410,178 | 11/1968 | Kytta | 91/369 A |
| 4,358,990 | 11/1982 | Takeuchi | 91/369 A |

*Primary Examiner*—Paul E. Maslousky
*Attorney, Agent, or Firm*—James B. Raden; Donald J. Breh

[57] ABSTRACT

A power brake booster, in which the valve piston is slidably supported in the control hub and cooperates with the poppet valve, that is formed of any rubber-elastic material. The poppet valve is designed as a cone valve. Thus when the valve passage is opened, atmospheric air enters the working chamber from the air chamber through the opening, that is arranged in the control hub transversely to the booster's longitudinal axis, to flow in almost undisturbed and without turbulence. To ensure a reliable sealing seat, the peripheral surface of the truncated-cone-shaped end of the valve piston is equipped with a curcumferential groove, the one lateral wall of the groove forming together with the peripheral surface a sealing edge which reliably abuts on the plane plate surface of the poppet valve when the valve is closed.

5 Claims, 3 Drawing Figures

VACUUM POWER BRAKE BOOSTER

BACKGROUND OF THE INVENTION

The present invention relates to a vacuum power brake booster composed of a vacuum casing, which is subdivided by at least one movable partition wall into at least one vacuum chamber and at least one working chamber, and of a partition wall which is connected to an axially movable control hub that contains a valve assembly, the control hub acting upon a force-delivering member via a reaction device.

From German printed and published patent application No. 29 18 908, a vacuum power brake booster for automotive vehicles is known which incudes a vacuum casing which is subdivided into a vacuum chamber and a working chamber by a rigid partition wall that is movable together with a control hub. Channels for air circulation are contained in the control hub to connect the hollow interior chamber of the control hub, wherein a valve assembly controlling the air circulation is arranged, to the vacuum chamber and the working chamber. The control hub accommodates a longitudinally slidable valve piston whose pedal-side end cooperates with a poppet valve. For this purpose, the valve piston comprises a valve plate with a sealing edge forming an annular bead and coacting with the end surface of the poppet valve that is close to the booster casing. This known power brake booster bears the disadvantage that disturbing noise is caused upon actuation of the valve assembly, the atmospheric air flows through the control hub and enters the working chamber. The air first penetrates the poppet valve in an axial direction, while subsequently it flows radially outwardly with the valve passage opened between the valve piston and the poppet valve and the air finally enters into the channel leading to the working chamber after having once more changed its direction in an abrupt manner.

SUMMARY OF THE INVENTION

It is an object of the present invention to provide a vacuum power brake booster whose valve assembly controlling the air circulation in the control hub is designed to avoid abrupt changes of direction of the entering atmospheric air, thus eliminating disturbing noise. Furthermore, the valve assembly is designed so that in existing vacuum power brake boosters, the desired effect is attainable by slight modification of the valve assembly.

This object is achieved in the present invention in that the valve piston cooperating with the poppet valve of the valve assembly is, at its end close to the valve plate of the poppet valve, designed as a right circular frustum whose peripheral surface faces the poppet valve. The peripheral surface of the circular frustum is in sealing abutment on the circular edge, which the valve plate of the poppet valve forms with the latter's inner wall, and/or on the plate surface, with the valve closed.

Preferably, the peripheral surface of the circular truncated-cone-shaped end of the valve piston contains a circumferential groove which, in conjunction with the peripheral surface, forms a circular sealing edge that cooperates with the end surface of the valve plate.

Preferably, the circumferential groove is arranged at about the medium height of the peripheral surface of the end of the valve piston that is designed as a right frustum.

To avoid an abrupt change of direction of air emanating between the peripheral surface of the valve piston and the valve plate of the poppet valve, the longitudinal axis of the opening in the control hub, extends in parallel to a surface line of the peripheral surface of the circular truncated-cone shaped end. The control hub opening forms the suction channel via which the annular chamber behind the circular truncated-cone-shaped end of the valve piston is connected to the working chamber.

With a view to obtaining a reliable sealing seat between the valve piston and the poppet valve, the circumferential groove arranged on the peripheral surface of the circular truncated-cone-shaped end of the valve piston is suitably furnished with at least one lateral wall which is the peripheral surface of a circular frustum and which forms a sealing edge of the configuration of an undercut together with the peripheral surface of the end of the valve piston.

BRIEF DESCRIPTION OF THE DRAWING

The principle of the present invention may be used in various embodiments, two embodiments being schematically illustrated in more detail with reference to the accompanying drawings. In the drawings.

DETAILED DESCRIPTION

Figure 1:
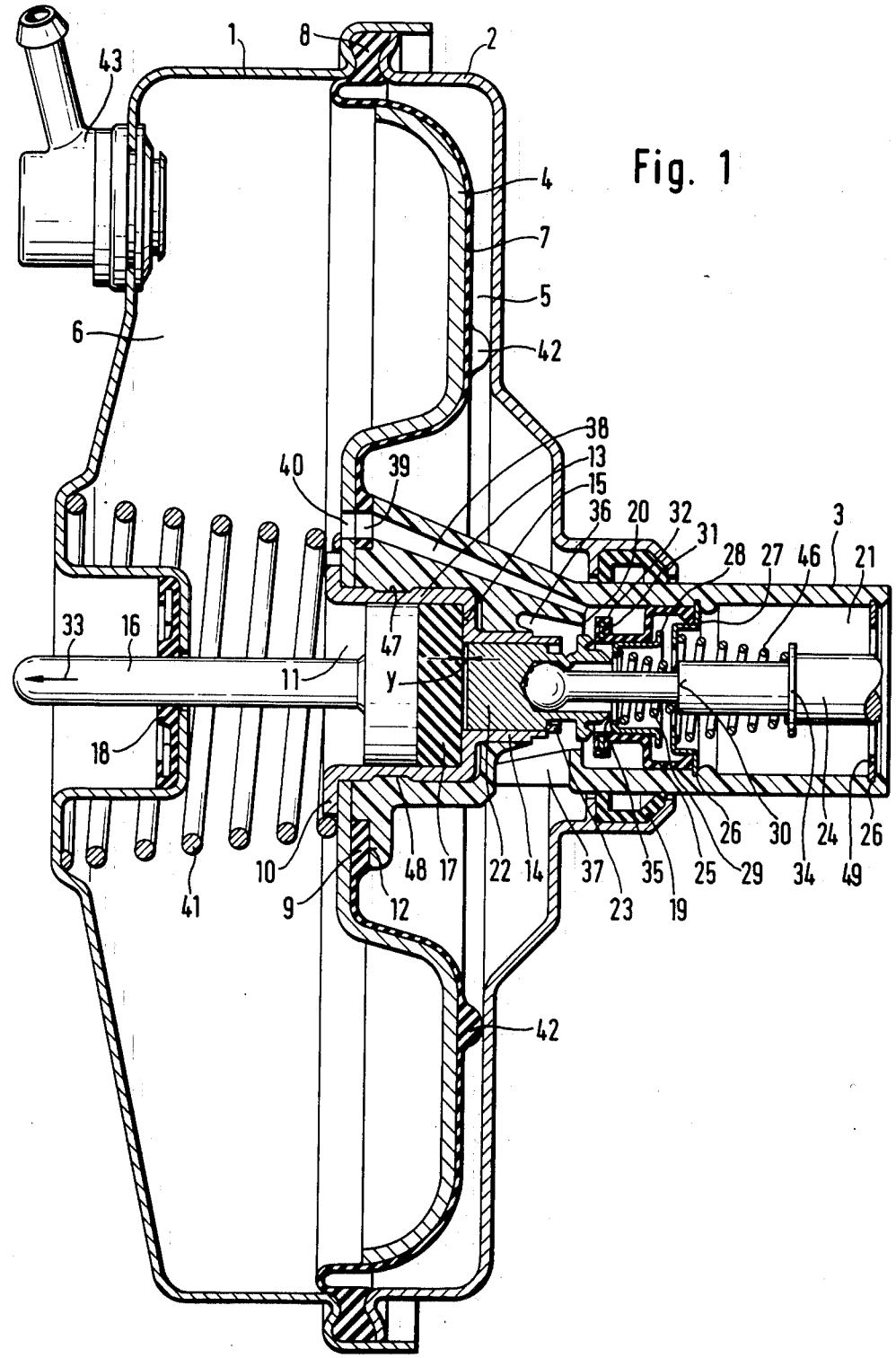
FIG. 1 is a longitudinal cross-section through a power brake booster.

The power brake booster illustrated in FIG. 1 comprises a vacuum casing composed of a bowl 1 and a cover 2. A partition wall 4 that is axially movable together with a control hub 3 subdivides the vacuum casing into a working chamber 5 and a vacuum chamber 6. A rubber diaphragm 7, the outer rim 8 of which is sealingly clamped between the bowl and cover of the vacuum casing while its inner rim 9 is sealingly clamped in the control hub, abuts on the partition wall on the side close to the working chamber and hence seals the vacuum chamber in relation to the working chamber. The partition wall 4 is retained in positive engagement at the end surface of the control hub that faces the direction of force delivery 33 by virtue of the collar 10 of a bushing 11 screwed into the control hub 3.

In this arrangement, the partition wall urges the inner rim 9 of the rubber diaphragm 7 tightly against the control hub 3, the inner rim being disposed in a circumferential groove 12 recessed on the end surface and open towards the direction of force delivery 33. The inserted bushing 11 is of stepped design and projects with its smaller-diameter portion 14 into the interior of the control hub. Sliding inside the larger diameter-portion 13 is the force-delivering member 16 which is supported via a reaction disc 17 on the step 15 to the smaller-diameter portion 14 in the bushing. The force-delivering member is sealedly guided through the bottom to the outside by means of a seal 18 that is tensionally held in the bottom of the bowl.

On the other side, the control hub penetrates the cover 2 and is axially open to atmosphere. By means of a seal 19 inserted in the cover in positive engagement therewith, the working chamber 5 is sealed to the environment. The interior of the control hub is of hollow design and shows essentially only one step 20 which forms the transition to the air chamber 21 having the largest diameter and being open atmosphere. The step 20 serves as a sealing edge for the valve assembly which is inserted in the air chamber 21 and disposed on the right and left side of the step. On the left side of the step 20, the valve piston 22 is supported in the smaller-diameter portion 14 of the bushing 11, and it is confined in its axial movability by projections 23. The valve piston 22 is clamped movably, but without axial clearance, on the spherical head of a stepped piston rod 24. The piston rod penetrates the air chamber 21 and is in connection with an actuating pedal (not shown).

Inserted in the air chamber 21 is a poppet valve 25 having an axial passage therethrough in flow communication with the air chamber 21 and defining an inner peripheral surface 51. The junction of the inner peripheral surface 51 and the radial end surface 54 of the poppet valve closest to the piston 22 defines a circular edge 50 that is penetrated with clearance by the piston rod. A shoulder 26 serves to retain the perforated disc 27 of Z-shaped cross-section in position in the control hub and to sealingly urge it against the inner wall of the air chamber 21. Fitted inside the poppet valve 25 is a bushing 28 which is urged against the valve plate 32 reinforced by an insert 31 by means of a spring 29 that takes support on a first step 30 of the piston rod 24. The piston rod 24 is in opposition to the direction of force delivery 33 acted upon by the force of another spring 46 effective between another step 34 of the piston rod and the disc 27. The valve piston 22 that is mechanically coupled to said piston rod moves with its annular sealing edge 35 into sealing abutment on the valve plate 32 and hence isolates the air chamber 21 from the booster's interior. On the left side of the step 20, the isolated chamber 36 is in communication with the working chamber 5 via two openings 37 shaped in the control hub, while on the right side of the step, disposed radially outwardly above the step, the chamber 36 is connected with the vacuum chamber via two channels 38 in the control hub, two openings 39 in the rubber diaphragm 7 and two bores 40 in the partition wall 4.

The inactive, brake release position of the vacuum power brake booster illustrated in FIG. 1 is determined by the spring 41 which shifts the partition wall in opposition to the direction of force delivery until the knob 42 on the rubber diaphragm is in abutment on the cover 2 of the vacuum casing. In the inactive, brake release position of the pedal, the air supply to the working chamber 5 is shut off due to the valve piston 22 abutting on the valve plate 32. As a result, vacuum prevails in the working chamber since the chamber communicates via the openings 37, the chamber 36 around the step 20, the channels 38 and the openings 39, 40 with the vacuum chamber 6 which is connected via the port 43 to a continuously operating vacuum source (not shown).

It can be seen from the inactive position of the vacuum power brake booster that the distance Y of the valve piston 22 from the reaction disc 17 of the force-delivering member 16 characterizes the lost travel of the booster.

When the pedal is actuated to a brake applied position, and both the piston rod 24 and the valve piston 22 displace as a result, the poppet valve 25 will follow this movement until the valve plate 32 abuts against the step 20. The channels 38 will then be isolated from the remaining chamber 36. The vacuum chamber and the working chamber will no longer be interconnected. The vacuum power brake booster is in the alert position. Upon further depression of the pedal, part of the force is directed via the reaction disc 17 directly onto the force-delivering member 16. At the same time, however, the sealing edge 35 of the valve piston 22 will move away from the end surface 54 of the poppet valve and connect the chamber 36 to the air chamber 21 via the axial passage in the poppet valve 25 and thus with the atmosphere. Air enters into the working chamber 5, and the developing pressure difference from the working chamber 5 to the vacuum chamber 6 tends to displace the partition wall 4 in the direction of force delivery 33. However, all resulting forces will be transmitted from the partition wall 4 via the bushing 11 directly onto the force-delivering member 16. The control hub 3 remains completely free from these actuating forces.

Figure 2:
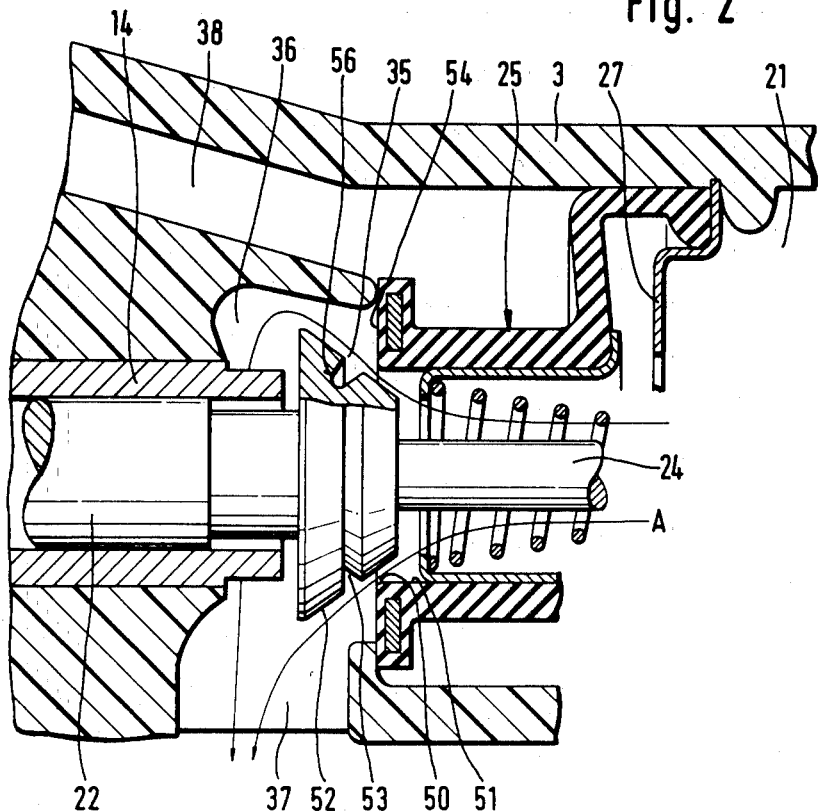
FIG. 2 shows the valve assembly of the power brake booster of FIG. 1 in longitudinal cross-section an enlarged scale.

The essence of the invention is the configuration of the valve piston 22, which is illustrated on a larger scale in FIG. 2. Piston 22 has an end close to the piston rod 24 that is designed as a circular frustum. When the peripheral surface 52 and the sealing edge 35, respectively, move away lift from the end surface 54, atmospheric air will propagate in an axial direction through the axial passage in the poppet valve 25 (in the direction of the arrow A) and between the peripheral surface 52 of the valve piston 22 and the edge 50 on the poppet valve 25 into the chamber 36 behind the truncated-cone-shaped end of the valve piston 22 through the openings 37 in the control hub 3 into the working chamber 5. As is shown by the lead indicating the direction of circulation, there will be no turbulence of the air flow when the atmospheric air passes from the air chamber 21 into the working chamber 5. Owing to this "calmed" or comparatively smooth and non-turbulent air flow, the valve assembly illustrated in FIG. 2 operates particularly noiselessly.

In the embodiment shown in FIG. 2, the sealing edge 35 is formed by a circumferential groove 53 in the conical surface 52 which has a lateral surface 56. The lateral surface 56 provides for the circular edge 35 formed to sealingly contact the end surface 54 in the brake release position of the valve. It can be seen that in this embodiment the conical peripheral surface provides for the minimum turbulence air flow hereinabove set out, while the seal created between the edge 35 and the surface 54 minimizes the surface area of the valve and thus, minimizes the restriction offered by the valve to the passage of air when the valve is open.

Instead of the groove 53 in the peripheral surface 52 there may be also provided a design with entirely ungrooved surface (not shown in more detail) of the truncated-cone-shaped end of the valve piston 22. In this case, the (annular) edge 50 formed by the inner surface 51 and by the end surface 54 of the poppet valve 25 represents the sealing seat at the poppet valve 25. This approach may possibly cause the shortcoming of rapid wear of the sealing edge 50 and resulting in a valve piston 22 whose sealing is uncertain in what should be its sealed position.

Figure 3:
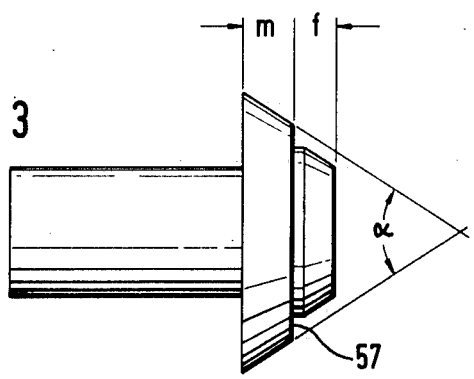
FIG. 3 shows a second embodiment of a valve piston wherein the end cooperating with the poppet valve comprises two differently sized frustums.

In the embodiment according to FIG. 3, the valve cone encloses an angle of $\gamma = 65°$, the one section f of the valve cone which is provided at the end facing the poppet valve 25 being designed slightly smaller than the other section m of the valve cone, so that a step 57 remains between the one section f and the other section m, on which step the end surface 54 of the poppet valve 25 will seat when the valve passage is closed.

What is claimed is:

1. A vacuum power brake booster including a vacuum casing subdivided by at least one movable partition wall into at least one vacuum chamber and at least one working chamber, said partition wall connected to an axially movable control hub including a control valve assembly means operatively associated with a piston rod and brake pedal for movement between a brake fully released position and a brake applied position, the control hub acting on a force-delivering member via a reaction device, the invention in which said valve assembly means includes a piston cooperating with a poppet valve member including an axial air passage defining an inner peripheral surface and including an end surface at an end thereof closest to said valve piston extending radially relative to the axis of said axial passage defining a circular edge at the junction of said inner peripheral surface and said end surface, said valve piston including a right circular, truncated-cone-shaped end defining a conical peripheral surface facing said end surface, said conical peripheral surface being in sealing abutment with said circular edge on said poppet valve in the brake fully released position.

2. A vacuum power brake booster as claimed in claim 1, in which the conical peripheral surface of the circular truncated-cone-shaped end of the valve piston includes a circumferential groove having a lateral surface portion defining a circular sealing edge in sealing abutment with the end surface of the poppet valve when in the brake fully released position.

3. A vacuum power brake booster as claimed in claim 2, in which the circumferential groove in the valve piston is located at about the midpoint along the length of the conical-shaped peripheral surface.

4. A vacuum power brake booster as claimed in claim 2, in which said control hub contains an opening the longitudinal axis of which forms a suction channel and via which an annular chamber behind the circular truncated-cone-shaped end of the valve piston is connected to the working chamber.

5. A vacuum power brake booster as claimed in claim 2, in which the end of the valve piston which has said conical surface and which cooperates with the poppet valve comprises two sections designed as right circular frustums with differing basal and top surfaces, the two circular frustums having like slope angles of the cone and being arranged coaxially relative to one another, while a step formed between the two sections constitutes the valve sealing surface which coacts with the poppet valve.

* * * * *